United States Patent [19]

Dassler

[11] Patent Number: 4,945,620

[45] Date of Patent: Aug. 7, 1990

[54] SPINDLE HEAD ASSEMBLY

[75] Inventor: Arnold Dassler, Aalen, Fed. Rep. of Germany

[73] Assignee: Schwaebische Huettenwerke GmbH, Aalen-Wasseralfingen, Fed. Rep. of Germany

[21] Appl. No.: 379,297

[22] Filed: Jul. 13, 1989

[30] Foreign Application Priority Data

Jul. 19, 1988 [DE] Fed. Rep. of Germany ....... 3824427

[51] Int. Cl.$^5$ ........................... B23B 7/04; B23C 1/12
[52] U.S. Cl. ...................................... 29/39; 184/6.14; 409/201
[58] Field of Search ............... 29/35.5, 39, 40, 48.5 R, 29/33 J; 408/35; 409/201, 144, 211, 215, 216, 230, 135; 184/6.14, 6.22, 6.27, 42, 55.1, 55.2, 57

[56] References Cited

U.S. PATENT DOCUMENTS

| | | | |
|---|---|---|---|
| 3,805,919 | 4/1974 | Nakamura et al. | 184/6.27 |
| 3,877,547 | 4/1975 | Willuweit et al. | 184/6.26 |
| 4,344,507 | 8/1982 | Osborne | 184/6.14 |
| 4,559,682 | 12/1985 | Sachot | 29/26 A |
| 4,610,584 | 9/1986 | Malzkorn et al. | 409/201 X |
| 4,787,785 | 11/1988 | Hiller et al. | 409/136 |

FOREIGN PATENT DOCUMENTS 30600 2/1983 Japan ................................. 184/6.26

Primary Examiner—William Briggs
Attorney, Agent, or Firm—Jenner & Block

[57] ABSTRACT

In a machine tool provided with a spindle head carrier and a spindle head mounted thereon when a drive shaft supported in the spindle head carrier drives a spindle via gears, an oil circulation chamber is provided for lubricating the gears. The chamber is sealed against the stationary part of the spindle head by sealing members, which are charged with compressed air via compressed pressure supply lines, and which direct compressed air to front sealing surfaces of the sealing members cooperating with rotating opposed sealing surfaces. The pressure ratios and the line cross-section are selected so that a sealing gap exists for the seal between the rotating opposed sealing surfaces and the sealing surfaces of the sealing members for contactless sealing.

19 Claims, 3 Drawing Sheets

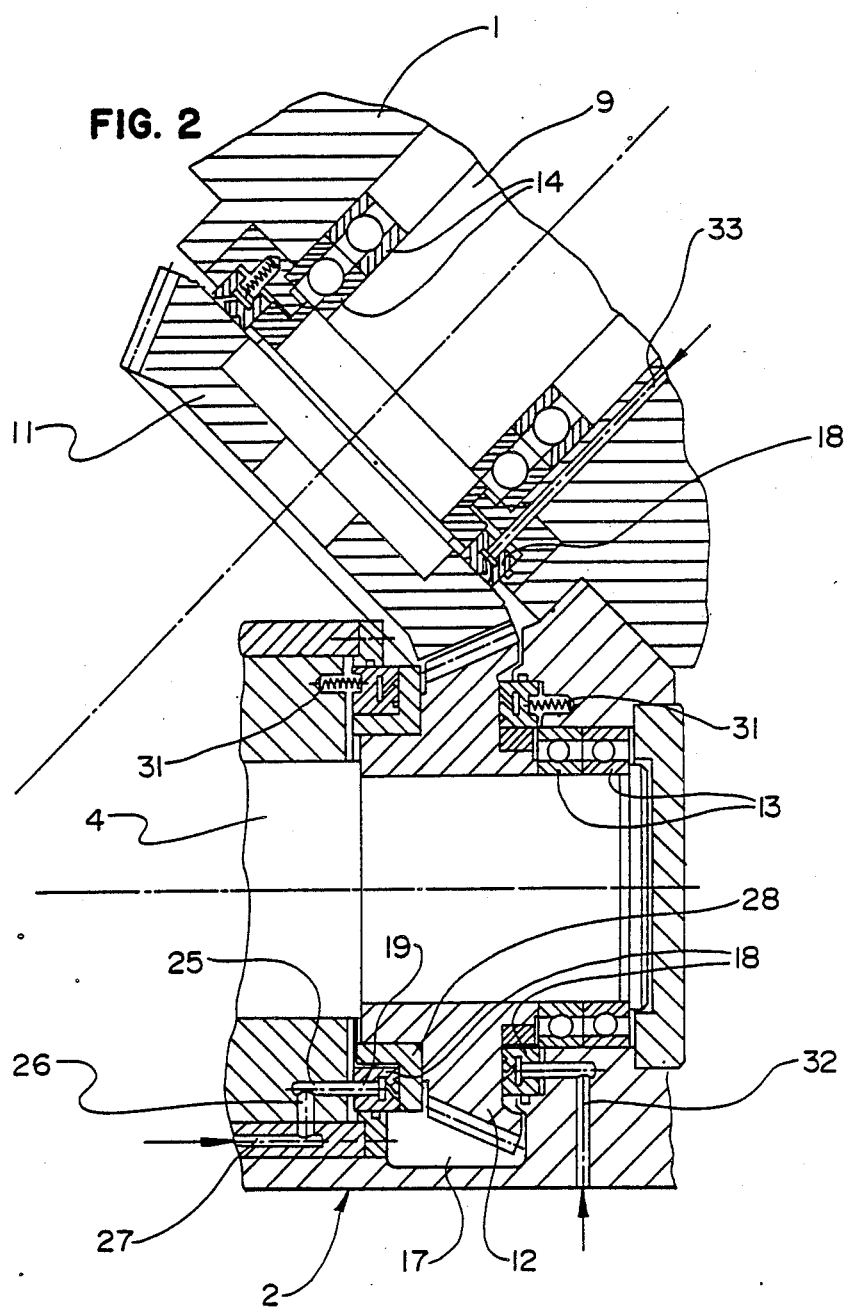

ABOUT SPINDLE HEAD ASSEMBLY

SPINDLE HEAD ASSEMBLY

TECHNICAL FIELD

The invention relates generally to a machine tool having a spindle head carrier and a spindle head having a spindle mounted thereon and in particular where the spindle head is connected with the spindle head carrier for providing both a horizontal and a vertical working position of the spindle such that the drive shaft mounted in the spindle head carrier is connected to the spindle in drive connection via gears, particularly bevelled gears.

BACKGROUND OF THE INVENTION

As generally known, an oil circulation lubrication is used for lubricating the gears at higher rotational speeds. For this type of lubrication, two conditions have been considered necessary:

(a) the oil hs to be able to flow freely from the gear chamber.
(b) the outwardly guided spindle has to be sealed by labyrinth packings and centrifuge discs in such a way, that even when the spindle is at a standstill oil cannot reach the outside.

It is desirable to eliminate the spindle seal having contacting seals, as the spindle tends to heat up too much as a result of the rotation of the spindle.

With the above mentioned milling head pivotal around 90 degrees having horizontal and vertical working positions of the spindle, condition (a) cannot be fulfilled due to the mounting ratios, and as a result (b) also becomes ineffective, because the oil would run through the labyrinth packings during spindle standstill. At the moment a dosed grease lubrication is used predominantly.

This means that a dosed and sufficient lubrication is only possible within limits, so that the rotational speed of the spindle is limited. Additionally, with the state of the art, elaborate measures have to be taken for cooling the spindle and the bearings. Also, sufficient lubrication has to be provided for the drive gears in the spindle head carrier.

Additional lubrication problems arise for milling and drilling machines provided with a spindle head, which can bring the spindle into a horizontal or vertical working position with pivotal movement around 90 degrees, due to these pivotal movements and the different working positions resulting therefrom. This lubrication problem is therefore one of the main disadvantages of known machine tools, because these result in upper limits for the rotational speed of the spindle.

SUMMARY OF THE INVENTION

It is therefore an object of the present invention to improve the lubrication in the spindle head, and, if desired, in the spindle head carrier for the parts to be lubricated, especially in such a way, that greater rotational speeds become possible.

According to the invention, this problem is solved by providing, in the region of the gears, an oil circulation chamber for lubrication of the gears, which is sealed against the stationary part of the spindle head by sealing members which can be rotary pistons, which are charged with compressed air via compressed air supply lines, and which direct compressed air to front sealing surfaces of the sealing members cooperating with rotating opposed sealing surfaces via choke bores, whereby the pressure ratios and the line cross-sections are chosen in such a way, that a seal gap exists for the sealing between the rotating opposed sealing surfaces and the sealing surfaces of the sealing members.

According to the invention, oil lubrication is conducted via an oil circulation chamber, whereby oil is prevented from emerging in undesired places due to the sealing of the oil circulation chamber by the compressed air. Also, pivotal movements of the spindle head, and therewith position changes of the gears have no influence on the lubrication in this arrangement. The compressed air introduced into the oil circulation chamber, and the positive pressure created thereby, ensures that the lubrication oil reaches the gears to be lubricated. This also means, that the oil circulation chamber is filled with an oil/air mixture, and that the gears do not rotate entirely in oil. For more precise lubrication, oil can be injected between the meshed gears via a nozzle holder, where the oil is discharged through a bore.

An additional advantage is that simultaneous cooling of the gears as well as of the spindle itself is achieved. Besides making it possible to drive the spindle at distinctly higher rotational speeds, with greater quietness, better operation of the assembly results from this approach.

To ensure that oil does not emerge from the oil circulation chamber when the spindle is stopped, the rotary pistons are provided with spring elements working in the direction of the sealing surfaces.

When the machine tool is not operating, the spring elements ensure that the two sealing surfaces are pressed against each other, whereby a sealed contact joint results.

A further advantage of these spring elements is, that sealing is ensured even during a failure of the compressed air during operation.

It is only necessary that the pressure ratios and the line cross-sections are selected so that the pressure produced on the sealing surface is greater than the opposed pressure of the spring elements and of the piston surface in the region of the compressed air supply, so that a contact freedom is provided during operation.

A simple and very effective measure for maintaining the pressure ratios is provided by an embodiment of the invention where the rotary piston is provided with a pressure equalization chamber which leads into the pressure supply line and from which one or more choke bores emerge to the sealing surface.

Inner pressure equalization takes place in the rotary pistons via the pressure equalization chamber for the compressed air introduced, and thus only the width of the choke bores or of a groove located on the sealing surface, into which the choke bore flows, and the annular diameter thereof, and the air pressure, is important for reaching the desired seal gap.

A simple structure for a rotary piston having a pressure equalization chamber comprises two piston parts connected to each other, which form an annular pressure equalization chamber therebetween.

Thereby, only a rigid, that is, pressure-tight connection of the two piston parts has to be ensured, so that the positive pressure can work evenly in all directions for pressure equalization.

A very advantageous and not obvious feature of the invention includes in directing part of the compressed air from the seal gap to the bearings of the spindle.

By this measure, the lubrication of the spindle bearings with oil or an oil containing air is achieved simultaneously with cooling thereof. By passing the air through the oil circulation chamber or through a corresponding guide of the compressed air in the circuit, it is accordingly enriched with a fine oil mist which provides a lubricating effect. Again, this measure makes possible an increase in the rotational speed of the spindle.

A further aspect of the invention is the provision of an oil circulation chamber for lubricating the drive gears in the region of the drive gears in the spindle head carrier, which is sealed against the stationary part of the spindle head carrier by sealing members, such as rotary pistons, which can further be charged with compressed air via compressed air supply lines that lead compressed air to front sealing surfaces of the sealing members cooperating with rotating opposed sealing surfaces, whereby the pressure ratios and the line cross-sections are chosen, so that a seal gap is present between the opposed sealing surface and the sealing surface of the sealing members.

With this measure, the the drive shaft gears in the spindle head carrier cooperating with a drive motor are also lubricated with oil in the same manner, which has, in connection with the other measures, an accordingly positive effect on possible rotational speeds.

To guarantee the sealing while the machine is disconnected or during a loss of the compressed air, the rotary pistons are provided with spring elements working in the direction of the opposed sealing surfaces.

Another feature of the invention provides for the oil circulation chamber in the spindle head carrier to be connected with the oil circulation chamber in the spindle head, and that both oil circulation chambers comprise a common compressed air outlet.

In this way, the positive pressure can easily be reduced or controlled via a corresponding outlet of the compressed air which can occur in a controlled way.

Advantageously, an oil/air filter will be provided in the pressure outlet line, so that the environment is not harmed, as the compressed air is generally passed off into the atmosphere.

Advantageously, the lubrication oil circuit can be provided with an oil cooler, so that the spindle head carrier can be kept at a constant temperature independent of the rotational speed.

In a further embodiment of the invention, it can be provided that the choke bore is directed transversely at an angle through the rotary piston in the direction of the corresponding oil circulation chamber.

By this measure, the injected compressed air is introduced precisely into the corresponding oil circulation chamber, and longer pathways arise for the desired throttling with a small construction of the rotary piston.

It is of advantage, to provide, in a further development of the invention, the sealing surface and/or the opposed sealing surface with a layer which comprises emergency running properties.

In the case of the loss of the compressed air supply, a warning device will be provided for avoiding damages or destruction. Since some time will pass until the rotating parts stop, damage or destruction can be avoided by using as for example a ceramic layer on the running parts.

In a further embodiment of the invention, it can be provided that the sealing surface each have even surfaces, and that circumferential grooves are arranged on one of the two sealing surfaces for outward pressure reduction.

A reduction of the impact pressure in the seal gap can be achieved by the circumferential grooves, whereby several can be arranged at various radial distances.

BRIEF DESCRIPTION OF THE DRAWINGS

FIG. 2 is an enlarged section through the region of the gears between the spindle head and the spindle head carrier;

DETAILED DESCRIPTION OF THE INVENTION

Figure 1:
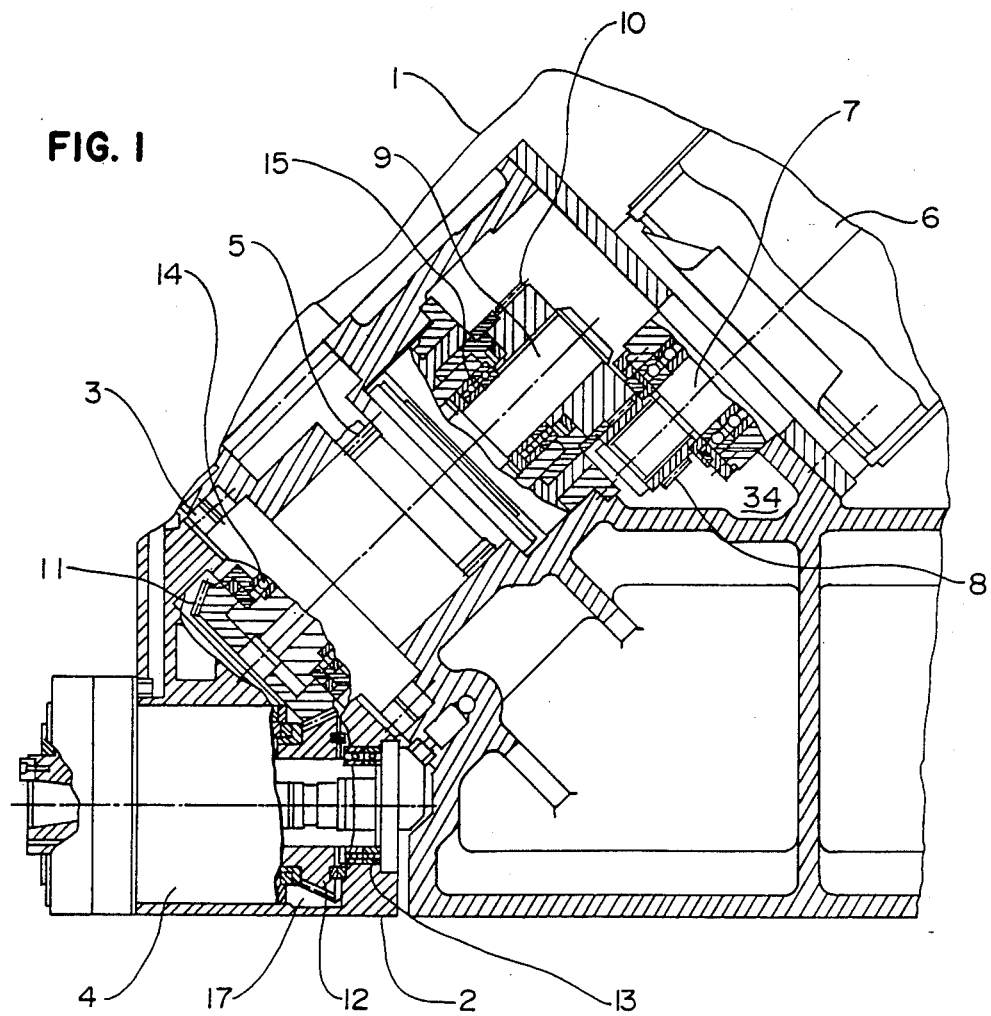
FIG. 1 is a side view, partially in cross-section, through a spindle head carrier and a spindle head mounted thereon.

In the following example of an embodiment of the invention, a milling machine having a spindle head carrier 1 and a spindle head 2 is shown as machine tool and in the figures. Since the arrangement of the spindle head 2 and of the spindle head carrier 1 is of generally known construction, only the parts essential to the invention are described in detail.

The spindle head 2 is connected to the spindle head carrier to pivot by 90 degrees, for example via a toothing of surface, as for example a Hirth-toothing 3. In this way, a horizontal as well as a vertical milling is possible with the spindle head 2, and a spindle 4 supported therein. After the Hirth-toothing is released, a gear 5, mounted in the spindle head carrier 1, serves as the pivotal movement of the spindle head 2. The pivotal movement of the spindle head 2 results from a gear piston not shown, together with the gear 5, whereupon again follows a locking via the Hirth-toothing 3.

The spindle 4 is driven by a motor 6 mounted on the spindle head carrier 1, on the outlet shaft 7 thereof is arranged a gear 8. The gear 8 cooperates with a gear 10 mounted on an intermediate shaft 9. At the lower end of the intermediate shaft 9, which is turned to the spindle head 2, is arranged a bevel gear 11, which is in drive connection with a bevel gear 2 mounted on the spindle 4. The spindle 4 is supported in rear bearings 13 and in front bearings (not shown), while the intermediate shaft is supported in front bearings 14 and in rear bearings 15. The motor shaft is supported in bearing 16.

Figure 3:
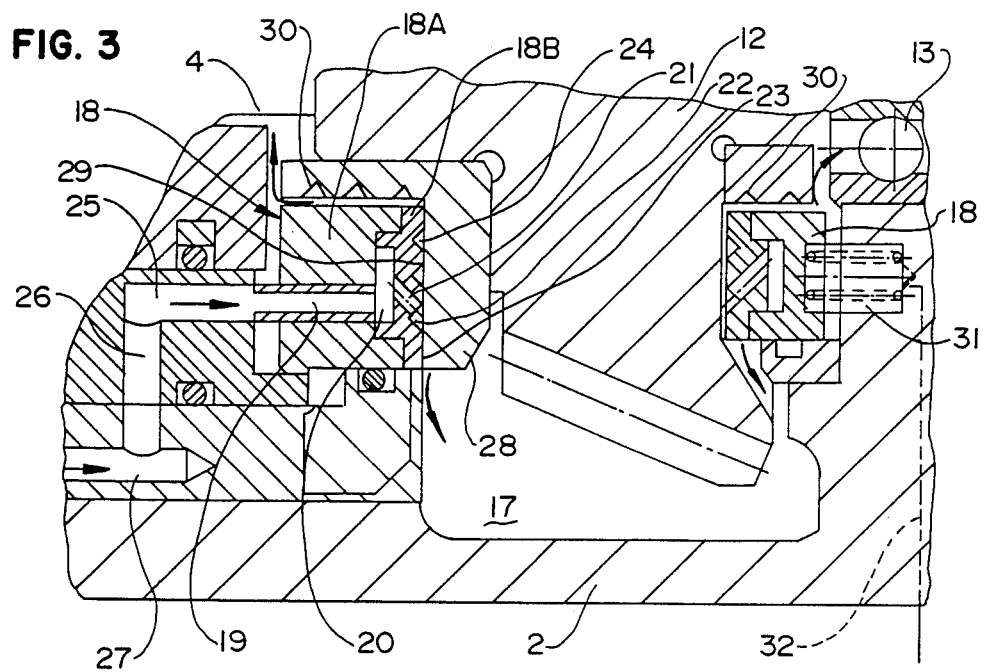
FIG. 3 is a sectional enlargement of the oil circulation chamber having sealing members in the spindle head.

For the lubrication of the bevel gears 11 and 12, an oil circulation chamber 17 is provided in the spindle head 2, which is sealed to the outside by sealing members. The oil circulation chamber 17 and the sealing members are shown more clearly in FIGS. 2 and 3. The sealing members comprise of rotary pistons 18, which are formed in two parts, whereby the two parts are firmly connected with each other. Every rotary piston 18 is provided with a base part 18A having at least one through bore 19 leading from the rear end to the front end. The bore 19 leads into a pressure equalization chamber 20 formed as an annulus, which is terminated by an annular part 18B. The annular part 18B is also provided with an annular recess, and is fitted with the walls of the recess into the annular recess 20 of base part 18A. One or more choke bores 21 are provided in the annular part 18B which lead into the pressure equalization chamber 20, while the other opening thereof leads to a V-type annular groove 22 of the front end of the annular part 18B formed as sealing surface 23. The longitudinal axis of the choke bore 21, which is shown enlarged in the figures for better representation, is chamfered in such a way, that their inner or front opening is directed closer to the oil circulation chamber 17. The sealing surface 23 of the annular part 18B is furthermore provided with one or more circumferential grooves 24 for pressure reduction. The bore 19 is connected with pressure supply lines 25, 26 and 27 in stationary parts of the spindle head. The sealing surface 23 cooperates with an opposed sealing surface 28, which can be a front end of the bevel gear 12, or an opposed sealing part 28 having opposed sealing surfaces 29 mounted thereon and rotating with the bevel gear. V-shaped circumferential grooves 30 can also be provided in the opposed sealing part 28, which is L-shaped in cross-section, and forms sealing surfaces with both parts of the "L." On the other side, a ring 42 serves as sealing surface or pressure reduction surface having circumferential groove 30.

The base part 18A of each rotary piston 18 is provided with one or more spring elements 31. The spring elements 31 are supported with one end in a stationary part of the milling head 2, respectively, while their other end lies in a recess on the rear side of the rotary piston 18, respectively. The rotary piston 18 is pressed against the opposed sealing surface 29 of the opposed sealing member 28 by the spring elements, respectively. For clearness and simplicity, the section in the enlarged depiction of FIG. 3 as opposed to FIG. 2 is positioned in such a way that a spring element 31 is shown for the right rotary piston instead of the pressure supply line 32. In FIG. 2, the spring elements are shown in the upper regions, respectively.

In the upper region of FIG. 2, the contactless sealing via compressed air for the bevel gear 11 opposite the spindle head carrier 1 can be seen. Thereby, the compressed air is directed via a line 33. The arrangement of the rotary piston and of the spring elements 31 is the same therein, as is described in FIG. 3.

Figure 4:
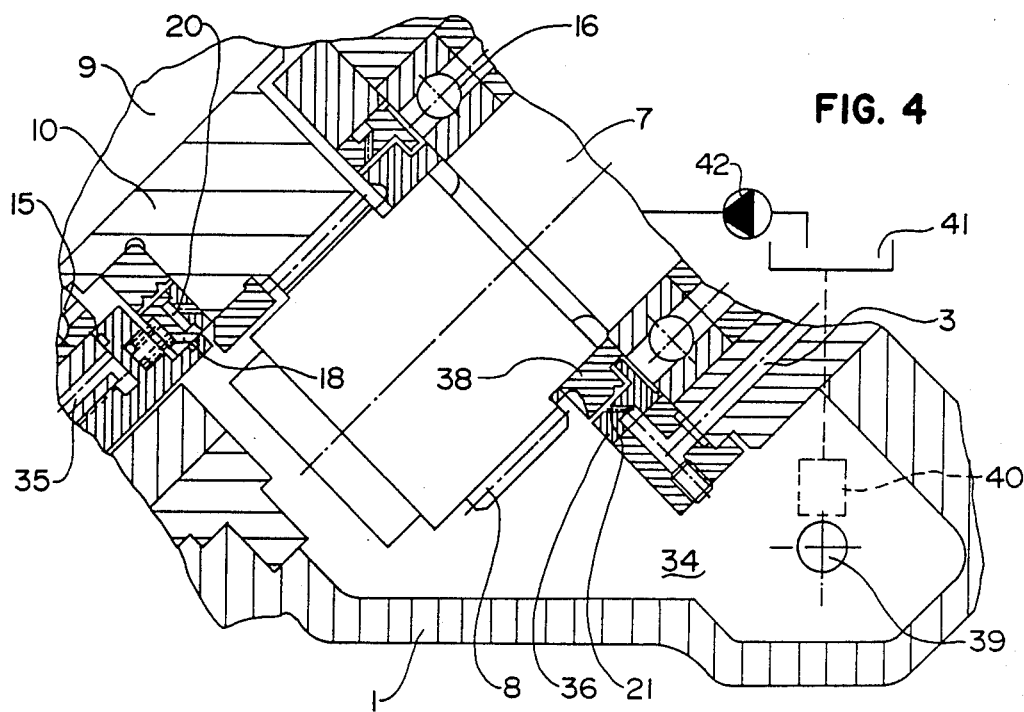
FIG. 4 is a sectional enlargement of the oil circulation chamber in the spindle head carrier.

In FIG. 4, an oil circulation chamber (shown scaled down in FIG. 1) can be seen together with its sealing. Here again, the sealing takes place contactless via compressed air, whereby the left sealing member in FIG. 4 corresponds to the rotary piston 18 in FIGJ. 3. Supply of compressed air follows in this case via a pressure line 35, whereby, for simplicity, the supply into the pressure equalization chamber 20 is not shown. The sealing of the motor shaft follows from a sealing member 36, which is supplied with compressed air via a pressure line 37, whereby the compressed air is available via the same chamfered bore 21 as in FIG. 3 in the sealing gap between the sealing member 36 and an opposed sealing member 38 on the motor shaft 7. The sealing member 36 is shown without pressure equalization chamber, as opposed to the rotary piston 18, as the contactless sealing is essentially also possible without the pressure equalization chamber 20. Obviously, the sealing member 36, formed as well as a rotary piston, can also be provided with a pressure equalization chamber 20.

A bore 39 leads from the oil equalization chamber 34 to the outside for discharging the positive pressure, whereby oil can be withdrawn simultaneously from the bore 39, which reaches an intermediate container 41 after passing through a condenser 40 (only shown dotted in FIG. 4), from where it is re-injected into the oil circulation chambers 17 and 34 via corresponding lines.

Preferably, the injection will take place in the region where the bevel gears 11 and 12 mesh or of the spur gears 8 and 9. A connection of the two oil circulation chambers 17 and 34 is given with the shaft gap 9, as far as separate connection lines are not provided therefor. The compressed air saturated with an oil mist is directed to the bearings, respectively, via the shaft gap of the intermediate shaft 9 and the shaft gap of the spindle 4. The front and rear bearings 13 of the spindle and the bearings 14 and 15 of the intermediate shaft 9 as well as of the motor shaft 16 are lubricated in this way.

The contactless sealing and the positive pressure function in the following way:

The introduction of compressed air follows via pressure lines 25, 26, 27, 32, 33, 35 and 37, respectively, whereby the pressure equalization chambers provides that pressure equalization in all directions. The compressed air is introduced into the sealing gap between the sealing surface 23 and the opposed sealing surface 29 via one or several choke bores 21, respectively, whereby it is provided, with corresponding spring strength of the spring elements, that a sealing gap develops between the corresponding surfaces; that is, that the rotary piston lifts off from the opposed sealing surface 9 against the force of the spring elements. Heretofore, it only has to be provided that the pressure build-up in the sealing gap is greater than the respective opposing force of the spring elements. The penetrated compressed air is discharged in the direction of the arrows, whereby a main stream reaches into the oil circulation chamber 17 or 34, respectively, while a partial stream with a corresponding pressure reduction reaches into the shaft sealing gap of the spindle 4 or of the intermediate shaft 9, such that the corresponding bearings are lubricated.

Generally, small surfaces are used as sealing surfaces, whereby one or both surfaces can be provided for example with a ceramic layer for emergencies.

I claim:

1. In a machine tool having a spindle head carrier and a spindle head having a spindle mounted thereon where the spindle head is connected pivotally to the spindle head carrier for horizontal and vertical working position of the spindle and where the drive shaft mounted in the spindle head carrier is in drive connection with a spindle via gears, a lubricating arrangement comprising:
    a first oil circulation chamber encompassing the gears;
    sealing means for sealing said first chamber to the spindle head including a plurality of sealing members having front sealing surfaces opposed to rotating sealing surfaces on the spindle head; and
    compressed air means for directing compressed air to said front surfaces including a compressed air line wherein the cross-section and air pressure is selected to provide a gap between said front surfaces and said rotating sealing surfaces.

2. The arrangement of claim 1 wherein said sealing members are rotary pistons.

3. The arrangement of claim 2 wherein each of said rotary pistons are provided with a spring element effective to bias said rotary pistons toward said rotating sealing surfaces.

4. The arrangement of claim 2 wherein said rotary pistons include a pressure equalization chamber for receiving said compressed air and a choke bore for directing said compressed air to said rotating sealing surfaces.

5. The arrangement of claim 4, wherein said rotary piston includes two members secured together to form said pressure equalization chamber.

6. The arrangement of claim 4 wherein said front sealing surface is configured with at least one circumferential groove and said choke bore is aligned so as to direct said compressed air into said groove.

7. The arrangement of claim 1 wherein the spindle includes a plurality of bearings and wherein said compressed air means includes means for directing said compressed air to said spindle bearings.

8. The arrangement of claim 1 wherein the spindle head carrier includes drive gears and additionally including;
- a second oil circulation chamber sealed to a stationary portion of the spindle head for lubricating said drive gears;
- a plurality of second sealing members configured with choke bores and having front sealing surfaces opposed to a rotating surface;
- wherein said compressed air means additionally includes means for supplying compressed air to said choke bore in said second sealing members which are effective to direct said compressed air between said second front sealing surface to provide a sealing gap.

9. The arrangement of claim 8 wherein said second sealing members are rotary pistons.

10. The arrangement of claim 9 wherein each of said rotary pistons are provided with a spring element effective to bias said pistons toward said rotating surface.

11. The arrangement of claim 8 wherein said first chamber is operatively connected to said second chamber and additionally including a common oil outlet line for said first and second chambers.

12. The arrangement of claim 11 wherein said outlet line includes an oil and air filter.

13. The arrangement of claim 11 wherein said outlet line includes a condenser.

14. The arrangement of claim 4 wherein said choke bores are chamfered in a direction through the piston in the direction of said first chamber.

15. The arrangement of claim 1 wherein said front sealing surface and said rotating surfaces include a layer of hard material.

16. The arrangement of claim 15 wherein said hard material is a ceramic material.

17. The arrangement of claim 1 wherein said front sealing surface and said rotating surface are smooth and wherein at least one of said surfaces is configured with circumferential grooves arranged outwardly for pressure reduction.

18. In a machine tool having a spindle head carrier and a spindle head having a spindle mounted thereon where the spindle head is connected pivotally to the spindle head carrier for horizontal and vertical working position of the spindle and where the drive shaft mounted in the spindle head carrier is in drive connection with a spindle via gears, a lubricating arrangement comprising:
- a first oil chamber encompassing said gears;
- sealing means for sealing said first chamber to the spindle head including a rotating sealing surface on the spindle head and a plurality of sealing members on the sealing head biased toward said rotating sealing surfaces; and
- gap means for maintaining a predetermined gap between said sealing members and said rotating sealing surfaces.

19. The arrangement of claim 18 wherein said gap means includes a source of compressed air and means for directing said compressed air between said sealing members and said rotating surfaces.

* * * * *

UNITED STATES PATENT AND TRADEMARK OFFICE
CERTIFICATE OF CORRECTION

PATENT NO. : 4,945,620
DATED : August 7, 1990
INVENTOR(S) : Arnold Dassler

It is certified that error appears in the above-identified patent and that said Letters Patent is hereby corrected as shown below:

On the title page, item [54] Abstract, line 2, change "when" to -- where --

Column 1, line 19, change "hs" to -- has --

Column 5, line 46, change "FIGJ." to -- FIG. --

Signed and Sealed this

Third Day of September, 1991

Attest:

HARRY F. MANBECK, JR.

*Attesting Officer*    *Commissioner of Patents and Trademarks*